United States Patent

[11] 3,612,982

[72] Inventors Billy R. Jones;
 Richard L. Konopa; Robert N. Green, all of Anderson, Ind.
[21] Appl. No. 66,500
[22] Filed Aug. 24, 1970
[45] Patented Oct. 12, 1971
[73] Assignee General Motors Corporation
 Detroit, Mich.

[54] VOLTAGE PROTECTION CIRCUIT FOR TRANSISTOR VOLTAGE REGULATOR
 5 Claims, 2 Drawing Figs.

[52] U.S. Cl. ................................................. 322/28,
 317/33 VR, 322/73, 323/22 T
[51] Int. Cl. ................................................. H02p 9/30
[50] Field of Search ........................................ 317/13 R, 31, 33 VR; 320/64, 68; 322/28, 36, 73; 323/22 T

[56] References Cited
 UNITED STATES PATENTS

| | | | |
|---|---|---|---|
| 3,467,854 | 9/1969 | Harland, Jr. et al. | 322/28 |
| 3,469,168 | 9/1969 | Harland, Jr. et al. | 322/28 X |
| 3,539,864 | 11/1970 | Harland, Jr. et al. | 322/28 X |
| 3,544,881 | 12/1970 | Raver et al. | 322/73 X |

*Primary Examiner*—William H. Beha, Jr.
*Assistant Examiner*—A. D. Pellinen
*Attorneys*—E. W. Christen and C. R. Meland ABSTRACT: The voltage regulator of this invention is used to regulate the output voltage of an alternating-current generator connected with a bridge rectifier to supply the electrical loads on a motor vehicle and to charge the vehicle's battery. The generator's field winding is supplied with current by a plurality of auxiliary diodes through a transistor-switching device controlled by one of two voltage-sensing circuits. The first or primary voltage-sensing circuit provides control of the transistor-switching device during normal operation. However, if this first voltage-sensing circuit becomes disconnected or is otherwise incapable of providing control, the second voltage-sensing circuit provides the requisite control to regulate the alternating-current generator's output voltage. In this manner, the output voltage of the alternating-current generator is maintained substantially constant even if the first voltage-sensing circuit is disconnected. The regulator includes a second transistor switching device coupling the two voltage-sensing circuits and operative to enable or disable the second voltage-sensing circuit depending on whether or not the first voltage-sensing circuit is connected and providing a control signal.

PATENTED OCT 12 1971

3,612,982

INVENTORS
*Billy R. Jones,
Richard L. Konopa, &
Robert N. Green*
BY
*C. L. Meland*
ATTORNEY

VOLTAGE PROTECTION CIRCUIT FOR TRANSISTOR VOLTAGE REGULATOR

This invention relates to a voltage-regulating system for regulating the output voltage of a direct-current power supply including an alternating-current generator utilized to supply electrical loads on a motor vehicle and to charge the motor vehicle's storage battery. The regulator of this invention is an improvement of the transistor regulators disclosed and claimed in U.S. Pat. No. 3,469,168 and in U.S. Pat. application Ser. No. 770,047, now U.S. Pat. No. 3,539,864 filed Oct. 23, 1968, both of which are assigned to the assignee of this invention.

In the electrical system of the present application, a transistor voltage regulator is provided which has an output transistor operated in a switching mode to control the supply of current to the field winding of an alternating-current generator, thus controlling the generator's output voltage. The generator's three-phase output winding is connected with a full-wave bridge rectifier to obtain a regulated direct voltage output. Three auxiliary diodes are used in combination with three of the main bridge rectifier diodes to supply direct voltage to the field winding through field-energizing terminals. The field winding and the output transistor are connected in series across the field-energizing terminals so that the energization of the field winding is controlled by the transistor.

A first or primary voltage-sensing circuit included in the voltage regulator is connected directly across the vehicle's battery which is provided charging current directly from the regulated DC output of the bridge-rectified generator. Thus, this first voltage-sensing circuit provides an indication of the charging voltage and regulation of this voltage is effected by the regulator. This regulation is accomplished by using the voltage indication of the first voltage-sensing circuit as a control signal to determine the operating mode, conductive or nonconductive, of the output transistor.

It is possible during servicing of the electrical system or as a consequence of certain malfunctions to inadvertently disconnect the first voltage-sensing circuit of the regulator from the battery or to disconnect the bridge rectified generator from the power supply lead which connects it with the battery. If the negative terminal of the bridge rectifier is inadvertently disconnected isolating the battery from the generator, the generator's field winding is also deenergized. However, if the positive terminal of the bridge rectifier is disconnected or if the voltage-sensing lead becomes disconnected isolating the first voltage-sensing circuit from the generator's output, the output transistor of the voltage regulator is biased continuously conductive and the field winding is continuously energized if the regulator is provided with just one voltage-sensing circuit. The accompanying high voltage can be detrimental to the storage battery or the voltage regulator. According to the present invention, a second voltage-sensing circuit connected across the field-energizing terminals is included to assume control and provide continuity of regulation even on the happening of this contingency. This second voltage-sensing circuit controls the output transistor of the regulator if the first voltage-sensing circuit is rendered incapable to provide control of the regulator. A transistor-switching device couples the two voltage-sensing circuits of the regulator. This transistor-switching device is operative to enable or disable the second voltage-sensing circuit depending on whether or not the first voltage-sensing circuit is connected and providing a control signal.

The primary voltage-sensing circuit of the regulator is permanently connected across the battery which is conductively connected with the output terminals of the bridge rectifier during normal operation. The second voltage-sensing circuit connected across the field-energizing terminals is included to provide a regulation signal if the first voltage-sensing circuit is disconnected from the generator's output. As noted, this second voltage-sensing circuit includes a transistor-switching device coupled with the first voltage-sensing circuit to prevent it from interfering with the control sequence when the first voltage-sensing circuit is connected and providing a control signal.

It is an object of this invention to provide a voltage regulator for a bridge-rectified alternating-current generator that supplies charging current to a vehicle battery which includes two voltage-sensing circuits capable of providing a regulation signal to the voltage regulator wherein the regulator is controlled exclusively by the regulation signal from one or the other voltage-sensing circuit depending on the connection of the first or primary voltage-sensing circuit.

It is another object of the present invention to provide a voltage regulator of the type described wherein an output transistor is operated in a switching mode to energize or deenergize the field winding of the generator and wherein the output transistor is controlled by a driver transistor which in turn is controlled by one of two voltage-sensing circuits.

Another object of this invention is to provide a voltage regulator of the type described wherein a first voltage-sensing circuit normally provides a regulation signal and a second voltage-sensing circuit is enabled by a transistor switch as a means for providing a regulation signal to maintain a substantially constant voltage upon the contingency that the first voltage-sensing circuit is disconnected from the supply system and thus rendered incapable to provide control of the regulator.

Another object of this invention is to provide a voltage regulator as described including two exclusive voltage-sensing circuits wherein the components of the system are formed as a single monolithic chip.

These and other objects and advantages of the present invention will be apparent in the light of the description included herein. The following figures which are incorporated in the description illustrate the preferred embodiment of the present invention.

Figure 1:
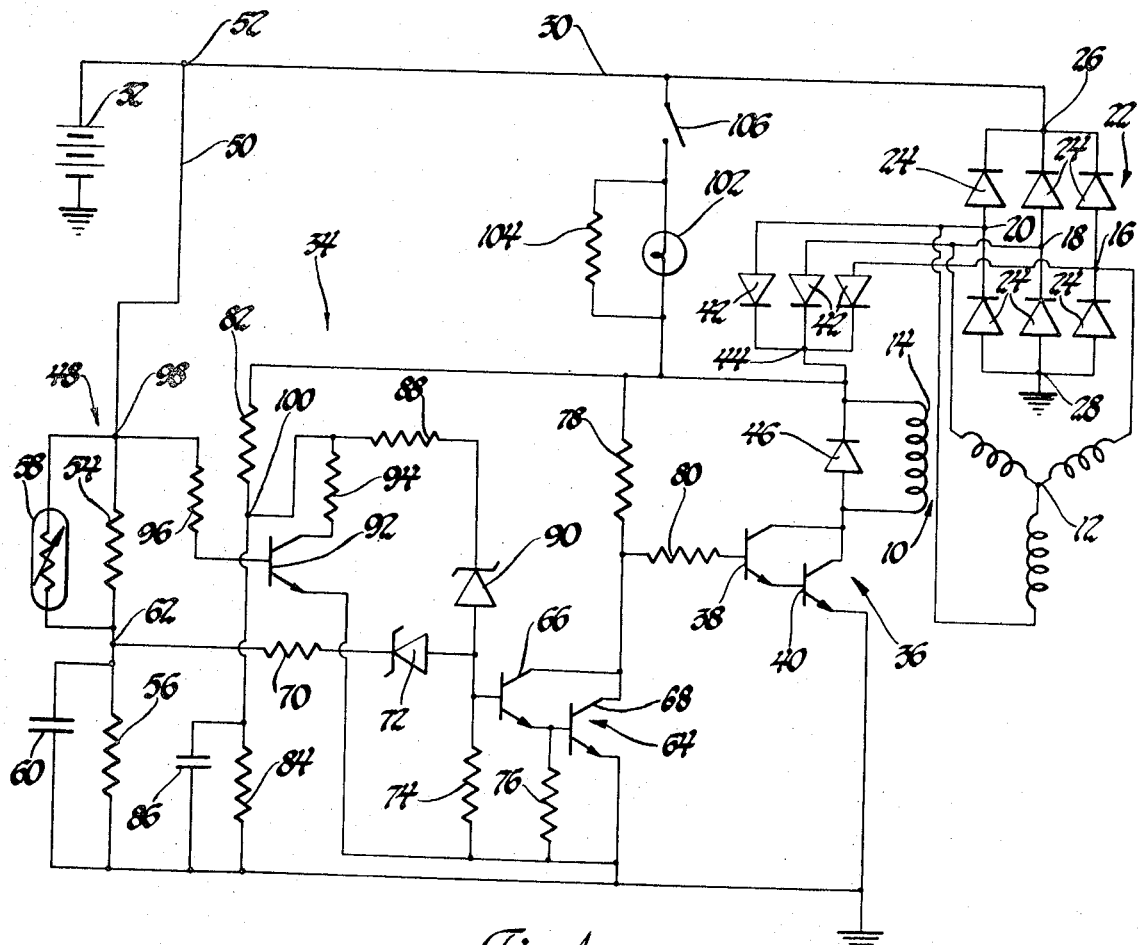
FIG. 1 is a schematic circuit diagram of a generator voltage regulator made in accordance with this invention.

Referring to the drawings and more particularly to FIG. 1, an electrical supply system for a motor vehicle is illustrated. This system includes an alternating-current generator 10 which has a polyphase Y-connected output winding 12 and a field winding 14. The generator 10 has a rotor (not illustrated) which is driven by the engine of the vehicle. The three-phase winding 12 is connected with the AC input terminals 16, 18 and 20 of a three-phase full-wave bridge rectifier network generally designated by reference numeral 22. The six diodes 24 which comprise the full-wave bridge rectifier network 22 are silicon diodes and it is seen that these diodes are connected such that the bridge rectifier provides two direct-current output terminals 26 and 28.

The positive direct-current output terminal 26 of the bridge rectifier 22 is connected by power supply conductor 30 with the positive terminal of a storage battery 32 included in the motor vehicle's electrical system. The negative potential output terminal 28 of the bridge rectifier 22 is connected with ground as is the negative terminal of the battery 32. Power supply conductor 30 thus provides a path for charging current to the battery 32 and it provides a connection with various vehicle electrical loads (not shown). This supply conductor 30 supplies charging current to the battery 32 when the generator 10 is being driven by the motor vehicle's internal combustion engine (not shown). When the engine is not driving generator 10, the reverse biased diodes 24 of bridge rectifier 22 prevent battery discharge through the output winding 12 of the generator 10.

The field winding 14 of generator 10 controls the amplitude of the output voltage of the generator. This follows inasmuch as the output voltage is dependent on both the speed at which the generator 10 is driven and the amplitude of the current in the field winding 14. Since the speed is determined by the speed of operation of the internal combustion engine, control of generator output voltage is most readily effected by control of the field current. The transistor regulator of this invention controls the field current to maintain a substantially constant output voltage from the generator 10 as measured at the terminals of the battery 32. This makes allowance for voltage drops in the diodes 24 and the conductor 30.

The voltage regulator 34 provides the requisite control of field current through the field winding 14 to regulate generator output voltage. The voltage regulator has a first switching device 36 serially connected with the field winding 14. This switching device 36 is represented as a two transistor switch including transistors 38 and 40 which have their collectors connected together and the emitter of transistor 38 connected with the base of transistor 40. The connected collectors and the emitter of transistor 40 comprise current carrying terminals which are serially connected with the field winding 14. The base of transistor 38 and the emitter of transistor 40 comprise control terminals for the switching device 36 by which the device is made conductive or nonconductive. This transistor combination provides a switching function to determine whether the circuit energizing the winding 14 is open or closed thus determining whether or not the field winding 14 is supplied field current.

A plurality of auxiliary diodes 42 are connected with the output winding 12 of the generator 10. Thus, it is seen that the three diodes 42 have their anodes connected respectively with input terminals 16, 18 and 20 of the full-wave bridge rectifier 22. The cathodes of these three auxiliary diodes 42 are connected together to provide a direct-current output terminal 44. This direct-current output terminal and the direct-current output terminal 28 of the main bridge rectifier 22 provide field-energizing terminals supplying DC voltage to the regulator 34 to energize the field winding 14. The serial combination of the switching device 36 and the field winding 14 noted above is connected across these two field-energizing terminals. Diode 46 connected in shunt with field winding 14 provides a field discharge circuit for the circulation of field current after the switching device 36 opens the field-energizing circuit.

A first voltage-sensing circuit 48 is provided to develop a regulation signal to control the switching device 36. This voltage-sensing circuit includes a voltage-sensing lead 50 connected directly with the positive terminal 52 of the storage battery 32. The voltage-sensing circuit 48 also includes resistors 54 and 56, temperature-responsive resistor 58 and filter capacitor 60 connected to provide a voltage divider network. The negative potential terminal of battery 32 is connected with resistor 56 and capacitor 60 via the common ground connection. Thus, the voltage divider provides a voltage signal at terminal 62 which is indicative of the voltage applied to the battery 32 by the DC output terminals 26 and 28 of the bridge rectifier 22.

The voltage signal at terminal 62 provides the primary control of a second switching device 64 which serves as a driver for the switching device 36 and includes transistors 66 and 68 which have their collectors connected together and the emitter of transistor 66 connected with the base of transistor 68. The collector connection of transistors 66 and 68 and the emitter terminal of transistor 68 comprise current-carrying terminals while the base of transistor 66 and the emitter of transistor 68 comprise control terminals for the switching device 64. A current-limiting resistor 70 connects the terminal 62 with the cathode of Zener diode 72 which in turn has its anode connected with the base of transistor 66 of the switching device 64. Resistors 74 and 76 connect the base electrodes of transistors 66 and 68, respectively, with ground. Resistor 78 provides a connection between the field-energizing terminal 44 and the collectors of transistors 66 and 68. Resistor 80 interconnects the collectors of transistors 66 and 68 with the base of transistor 38.

In the absence of a base signal to transistor 66, the switching device 64 is nonconductive. Inasmuch as the current carrying terminals of switching device 64 are connected in shunt with the control terminals of switching device 36, it should be appreciated that the switching device 36 is provided a base current to bias it conductive, connecting field winding 14 across the field-energizing terminals 28 and 44, when the switching device 64 is nonconductive. The voltage across the current-carrying terminals of switching device 64 which sustains switching device 36 in the conductive mode is the sum of the voltage drops across resistor 80 and the two base-emitter junctions of transistors 38 and 40.

When the voltage between terminal 62 are ground exceeds the breakdown voltages of Zener diode 72 and the base-emitter junctions of transistors 66 and 68, the transistor 68 will be biased conductive in its collector-emitter circuit and switching device 64 will be "On." When the switching device 64 is conductive, the potential at the collector connection of transistors 66 and 68 is reduced substantially to ground potential. This reduces the potential applied across the base-emitter junctions of transistors 38 and 40 causing the transistors 38 and 40 to terminate conduction, terminating the supply of field current to field winding 14 by switching the switching device 36 to its nonconductive mode. In this manner, it is appreciated that the field winding 14 is no longer supplied by the field-energizing terminals 28 and 44. However, it is noted that current continuity is maintained through the diode 46 such that current decay in winding 14 pursues a substantially exponential path.

As noted above, the voltage between junction 62 and ground is a function of the voltage across the terminals of the battery 32. By appropriately proportioning the resistors of the voltage divider of the voltage-sensing circuit 48, the amplitude of the regulated voltage applied to the battery 32 can be controlled to any desired value. For example, this voltage can be regulated at approximately 14 volts for a 12-volt vehicle electrical system. Since the Zener diode 72 senses this voltage and alternately blocks and conducts in the reverse direction, it causes the switching device 36 to switch "On" and "Off" continuously to maintain a substantially constant battery-charging voltage.

The single-sensing circuit-regulating system that has been described will operate properly as long as the voltage-sensing circuit 48 is sensing the normal charging voltage from the output of bridge rectifier 22. It can be seen, however, that if for some reason the voltage-sensing circuit 48 does not respond to the output voltage across terminals 26 and 28, the system would bias the switching device 36 on continuously. In this situation, field current would be continuously supplied through diodes 42 to the field winding 14. A high destructive voltage would be produced by the generator 10 which could damage components of the voltage regulator 34, damage diodes 24 or diodes 42, or be detrimental to the battery 32.

A second voltage-sensing circuit is provided for controlling the switching device 64 and ultimately the switching device 36 upon the failure of the first voltage-sensing circuit to maintain control. This second voltage-sensing circuit is connected directly across the field-energizing terminals 28 and 44 and includes a voltage divider comprised of resistors 82 and 84 and filter capacitor 86. Resistor 88 connects the anode of a Zener diode 90 with terminal 100 which is the tap point of the voltage divider. An NPN transistor 92 and a resistor 94 connected serially between terminal 100 and ground shunt a portion of the second voltage-sensing circuit voltage divider and the Zener diode 90. The resistor 94 has less resistance than resistor 84 and in a 12-volt system, these resistors may have resistance values of 750 ohms and 2,700 ohms, respectively. In this manner, it should be appreciated that the resistance between terminal 100 and ground is dependent on the conductive state of transistor 92. Thus, for a given voltage between field-energizing terminals 28 and 44, the voltage between terminal 100 and ground which is concurrently applied to the Zener diode 90 will be dependent upon whether or not transistor 92 is operating in its conductive mode. If its collector-emitter current-carrying terminals are conducting the voltage between terminal 100 and ground will be less than it would be if the current-carrying terminals were not conducting. A resistor 96 connects the base of transistor 92 with terminal 98 of the first voltage-sensing circuit 48. Thus, the NPN transistor 92 is biased conductive by the bias voltage applied to its base and emitter control terminals when terminal 98 is at the positive potential of battery 32 and it will remain conductive so long as the voltage-sensing lead 50 is intact.

If the power supply conductor 30 is disconnected from terminal 26, or is otherwise severed such that it is unable to supply a charging current to the battery 32, the first voltage-sensing circuit 48 acting alone would cause the switching device 36 to be continuously conductive. In this situation, the voltage applied to the voltage-sensing lead 50 would not follow the output voltage of the bridge rectifier 22; rather, it would sense only the voltage of the storage battery 32. No increase in voltage at terminal 62 would accompany an increase in output voltage from the bridge rectifier 22 and the first voltage-sensing circuit would be incapable of providing the requisite control of the bridge-rectified generator. The voltage between the field-energizing terminals 28 and 44 would rise to a level at which damage to the regulator or the diodes could occur if no provision were made for alternative regulation. Although transistor 92 would be in its conductive mode, the voltage at terminal 100 would rise in a manner and to a degree corresponding with the increase in voltage between the field-energizing terminals 28 and 44. By appropriately selecting resistors 82, 84 and 94, the voltage at terminal 100 can be adjusted to break over Zener diode 90 and the base-emitter junctions of transistors 66 and 68 before any damage results even though the transistor 92 is conductive. In this fashion, Zener diode 90 operating in its Zener mode would bias the switching device 64 on to cause the switching device 36 to be nonconductive terminating the supply of field current to the field winding 14. Switching device 64 would be continuously cycled "On" and "Off" as the voltage between terminals 28 and 44 varied. Thus, the field current supplied to field winding 14 would be controlled. The resultant control voltage which would obtain between terminals 26 and 28 would be higher than that normally obtained but would be lower than that necessary to cause damage.

Upon the loss of voltage at terminal 98 by the opening of the sensing lead 50 connection with terminal 52 of battery 32, the first voltage-sensing circuit is rendered incapable to control the regulator and the transistor 92 having lost its base bias ceases conduction. In this situation, the second voltage sensing circuit will assume control of the voltage regulator. The control provided by the second voltage-sensing circuit is substantially the same as that described above with respect to the first voltage-sensing circuit. Switching device 64 is nonconductive until provided a control signal from the second voltage-sensing circuit. This occurs when the voltage at terminal 100 attains an amplitude in excess of a predetermined maximum value causing Zener diode 90 to commence operation in the Zener mode, thus providing a signal to the control terminals of the switching device 64. This switches the switching device 64 conductive causing switching device 36 to be nonconductive in the manner set forth above. The second voltage-sensing circuit will regulate the battery charging voltage at substantially the same amplitude as the first voltage-sensing circuit by continuously switching the switching device 36 "On" and "Off" when lead 50 is disconnected from terminal 52.

At the expense of some reiteration, the operation of the system of this invention will now be summarized for three conditions: namely, a first normal operating condition; a second condition where the lead 50 is connected to terminal 52 but the conductor 30 is disconnected from direct-current terminal 26; and a third condition where the lead 50 is disconnected from terminal 52.

During the normal operation of the first condition, the transistor 92 is biased conductive with the result that the voltage appearing between junction 100 and ground is not sufficient to break down the circuit comprised of Zener diode 90 and the base-emitter junctions of transistors 66 and 68. This means that the first voltage-sensing circuit 48 and Zener diode 72 will have exclusive control of the voltage regulator. Thus, a desired regulated voltage will be maintained between terminal 52 and ground for charging the batty, for example, 14 volts in a 12-volt system.

During the second condition of operation where the voltage-sensing lead 50 is connected to terminal 52 but conductor 30 is disconnected from direct-current output terminal 26, it is apparent that the only voltage sensed by the first voltage-sensing circuit 48 is the terminal voltage of battery 32. The portion of this voltage which appears between junction 62 and ground is not sufficient to break down the circuit comprised of Zener diode 72 and the base-emitter junctions of transistors 66 and 68. In this situation, transistor switch 64 is never biased conductive by the first voltage-sensing circuit 48 and the Zener diode 72 with the result that transistor switch 36 is biased fully conductive until brought under control by the second voltage-sensing circuit. This means that the output voltage of the generator 10 will increase since the field winding 14 is continuously supplied current by terminals 28 and 44. Since the voltage-sensing lead 50 is connected to terminal 52, the transistor 92 will be conductive. Accordingly, the resistance between terminal 100 and ground is less than it is when the transistor 92 is nonconductive. This means that a lower proportion of the voltage between terminals 28 and 44 is developed between terminal 100 and ground than is developed between terminal 100 and ground when the transistor 92 is nonconductive with the further result that a higher output voltage from the generator is required to bias the transistor switch 64 conductive as compared to the situation where the transistor 92 is nonconductive. Thus, the output voltage from generator 100 will go above the desired regulated value of approximately 14 volts in the 12-volt system before transistor switch 64 is turned "On" to switch transistor switch 36 "Off." When this higher voltage is reached, the regulator will cause transistor switch 36 to continuously turn "On" and "Off" under the control of Zener diode 90 and the base-emitter junctions of transistors 66 and 68 with the result that a higher voltage will appear between terminals 28 and 44 than that associated with the desired regulated voltage, but this voltage will not be high enough to destroy the components of the regulator and since conductor 30 is not connected with junction 26, there is no overcharging of the battery by this higher voltage condition.

The third condition when lead 50 is disconnected from terminal 52 causes the transistor 92 to be biased nonconductive. As a result of this, a higher proportion of the voltage appearing between terminals 28 and 44 is developed between terminal 100 and ground as compared to the condition where transistor 92 is conductive. This means that a higher voltage will be applied to the second voltage-sensing circuit and Zener diode 90 and the base-emitter junctions of transistors 66 and 68 with the result that the transistor switch 64 is switched "On" and "Off" at a lower regulated output voltage for the generator 10 than is the case when transistor 92 is conductive. The system is arranged such that this regulated voltage has substantially the same value as the regulated voltage that is provided when the first voltage-sensing circuit 48 and Zener diode 72 are controlling the regulator so that the desired regulated voltage of, for example, 14 volts, is maintained to charge the battery 32 even though head 50 is disconnected from terminal 52. This operation is in contrast with the operation of the system shown in the above-mentioned U.S. Pat. No. 3,469,168 where loss of the voltage sensing lead causes a higher voltage than the desired regulated voltage to be applied to the battery and in contrast with the operation of the system shown in the above-mentioned patent application Ser. No. 770,047 now U.S. Pat. No. 3,539,864 where loss of the voltage-sensing lead shuts down the generator field so that no charging voltage is applied to the battery.

In the unlikely event that voltage-sensing lead 50 is disconnected from terminal 52 and conductor 30 is disconnected from terminal 26, the system will regulate at the desired regulated voltage since transistor 92 will be biased nonconductive. The resultant control sequence is the same as that described above for the third operating condition.

The vehicle electrical system includes an indicator lamp 102 connected in parallel with a resistor 104 which are serially connected with an ignition switch 106. When the vehicle's internal combustion engine is initially started, switch 106 is closed and the field winding 14 is energized by the battery 32 through a circuit which is traced from the positive terminal of the battery 32 through the switch 106, through the lamp 102-resistor 104 combination, through the field winding 14 through switching device 36, through ground to the negative terminal of battery 32. Thus, during starting, the signal lamp 102 is illuminated. After the generator comes up to voltage, the potential on opposite sides of the signal lamp 102 equalizes and the lamp is turned off. Upon the occurrence of a system failure causing a voltage difference across the lamp 102, the lamp will light up to indicate the malfunction.

It is understood that during initial energization of field winding 14, switching device 36 is biased conductive according to the manner recited above via the first voltage sensing circuit. When the ignition switch 106 is opened, the only discharge path for the battery 32 is through the high resistance voltage divider of the first voltage-sensing circuit 48. This follows since diodes 24 are reverse biased and the field winding 14 is isolated from the battery by the open switch 106.

Figure 2:
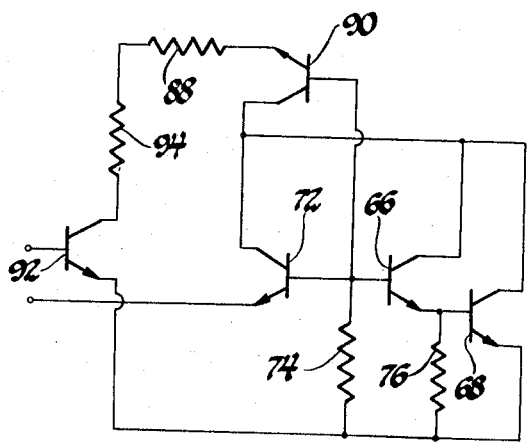
FIG. 2 is a schematic circuit diagram of a monolithic chip forming a part of the voltage regulator of FIG. 1.

Referring now to FIG. 2, a circuit diagram is illustrated for an integrated circuit where the switching device 64, Zener diodes 72 and 90, the transistor 92, the resistors 74, 76, 88, and 94 are formed as a single monolithic chip. It is preferred that the regulating system be fabricated by this technique and it will be appreciated from an inspection of FIG. 2 that a common common collector connection formed of N-type material is utilized for the chip. In FIG. 2, the same reference numerals have been used as were used in FIG. 1 to designate functionally identical portions of the circuit. It will be appreciated from an inspection of FIG. 2 that the Zener diode 72 is the emitter-base junction of an NPN transistor and the Zener diode 90 is likewise the emitter-base junction of another NPN transistor. In both the FIG. 1 and FIG. 2 circuit diagrams, the common connections pictured for the monolithic chip are apparent.

Although this description has proceeded in terms of a voltage regulator for a motor vehicle electrical system having a particular design, it will be appreciated by those skilled in the art that design variations can be made without changing the basic operation of the regulator. It is understood that the foregoing description and drawings are merely exemplary and are not intended as limitations.

We claim:

1. An electrical system comprising: an alternating-current generator having an output winding and a field winding, a bridge rectifier network having AC input terminals connected with said output winding and two direct-current output terminals, a battery, means connecting said battery directly across said output terminals of said bridge rectifier whereby said bridge rectifier supplies charging current to said battery, a plurality of auxiliary diodes connected with said output winding, said auxiliary diodes being connected with a third direct-current output terminal, said third direct-current output terminal and one of said two direct-current output terminals of said bridge rectifier forming field-energizing terminals, a voltage regulator including a first switching device having a pair of current-carrying terminals and a pair of control terminals, means serially connecting said field winding and said current-carrying terminals of said first switching device across said field-energizing terminals, a first voltage-sensing circuit for said voltage regulator, means including a voltage-sensing lead connected with a first terminal of said battery connecting said first voltage-sensing circuit across said battery, means coupling said first voltage-sensing circuit with said first switching device to control the conduction of said device as a function of the output voltage of said generator, a second voltage-sensing circuit for said voltage regulator, means connecting said second voltage-sensing circuit across said field-energizing terminals, means connecting said second voltage-sensing circuit with said first switching device, a second switching device connected with said second voltage-sensing circuit and said voltage-sensing lead operative to enable said second voltage-sensing circuit as a control for said regulator when said voltage-sensing lead is disconnected from said battery, said second switching device disabling said second voltage-sensing circuit as a control for said regulator when said voltage-sensing lead is connected to said battery and when said bridge rectifier is connected with said battery.

2. An electrical system comprising: an alternating-current generator having an output winding and a field winding, a bridge rectifier network having AC input terminals connected with said output winding and two direct-current output terminals, a battery, means connecting said battery directly across said output terminals of said bridge rectifier whereby said bridge rectifier supplies charging current to said battery, a plurality of auxiliary diodes connected with said output winding, said auxiliary diodes being connected with a third direct-current output terminal, said third direct-current output terminal and one of said two direct-current output terminals of said bridge rectifier forming field-energizing terminals, a voltage regulator including a first semiconductor-switching means having a pair of current-carrying terminals and a pair of control terminals, means serially connecting said field winding and said current-carrying terminals of said first semiconductor-switching means across said field-energizing terminals, a first voltage-sensing circuit for said voltage regulator, means including a voltage-sensing lead connected with a first terminal of said battery connecting said first voltage-sensing circuit across said battery, means including a first voltage-responsive device coupling said first voltage-sensing circuit with said first semiconductor-switching means to control the conduction of said first semiconductor-switching means as a function of the output voltage of said generator, a second voltage-sensing circuit for said voltage regulator, means connecting said second voltage-sensing circuit across said field-energizing terminals, means including a second voltage-responsive device coupling said second voltage-sensing circuit with said first semiconductor-switching means, a second semiconductor-switching means, means connecting said second semiconductor-switching means in shunt with at least a part of said second voltage-sensing circuit, and means connecting said voltage-sensing lead with said second semiconductor-switching means to control the conduction of said second semiconductor-switching means, said second semiconductor-switching means being conductive and reducing the control voltage applied to said second voltage-responsive device when said voltage-sensing lead is connected with said first terminal of said battery, said second semiconductor-switching means being nonconductive and enabling said second voltage-sensing circuit to apply a voltage to said second voltage-responsive device to control said regulator when said voltage-sensing lead is disconnected from said battery.

3. An electrical system comprising: an alternating-current generator having an output winding and a field winding, a bridge rectifier network having AC input terminals connected with said output winding and two direct-current output terminals, a battery, means connecting said battery directly across said output terminals of said bridge rectifier whereby said bridge rectifier supplies charging current to said battery, a plurality of auxiliary diodes connected with said output winding, said auxiliary diodes being connected with a third direct-current output terminal, said third direct-current output terminal and one of said two direct-current output terminals of said bridge rectifier forming field-energizing terminals, a voltage regulator including a first transistor switching means having collector-emitter current-carrying terminals and base-emitter control terminals, means serially connecting said field winding and said current-carrying terminals of said first transistor switching means across said field-energizing terminals, a first voltage-sensing circuit for said voltage regulator, means including a voltage-sensing lead connected with a first terminal of said battery connecting said first voltage-sensing circuit across said battery, a transistor driver means having collector-emitter current-carrying and base-emitter control terminals, said current-carrying terminals of said driver means being connected with said control terminals of said first transistor-switching means to render said first transistor-switching means conductive when said driver means is nonconductive and to render said first transistor-switching means nonconductive when said driver means is conductive, a first Zener diode, means connecting said first Zener diode between said first voltage-sensing circuit and one control terminal of said transistor driver means, a second voltage-sensing circuit for said voltage regulator, means connecting said second voltage-sensing circuit across said field-energizing terminals, a second Zener diode, means connecting said second Zener diode between said second voltage-sensing circuit and one control terminal of said transistor driver means, a second transistor-switching means having collector-emitter current-carrying terminals and base-emitter control terminals, means connecting said second transistor-switching means in shunt with at least a part of said second voltage-sensing circuit, and means coupling said voltage-sensing lead with the base-emitter control terminals of said second transistor-switching means to control the conduction of said second transistor-switching means, said second transistor-switching means being biased conductive and operative to reduce the voltage applied by said second voltage-sensing circuit to said second Zener diode and the control terminals of said driver transistor means to a value which is not sufficient to bias said driver transistor means conductive when said voltage-sensing lead is connected with said first terminal of said battery and when said bridge rectifier is connected with said battery, said second transistor-switching means being nonconductive and enabling said second voltage-sensing circuit as a control for said regulator when said voltage-sensing lead is disconnected from said battery.

4. An electrical system comprising: an alternating-current generator having an output winding and a field winding, a bridge rectifier network having AC input terminals connected with said output winding and direct-current output terminals, a battery, means connecting said battery across said output terminals of said bridge rectifier, a plurality of auxiliary diodes connected with said output winding, said auxiliary diodes being connected with a third direct-current terminal, said third direct-current output terminal and one of said two direct-current output terminals of said bridge rectifier forming field-energizing terminals, a voltage regulator having a field-current control means, means connecting said field winding and said field-current control means in series across said field energizing terminals, a first voltage-developing circuit, means including a voltage-sensing lead connecting said first voltage-developing circuit across said battery, means coupling said first voltage-developing circuit and said field-current control means whereby said field-current control means is controlled as a function of the voltage developed across said first voltage-developing circuit, a second voltage-developing circuit connected across said field-energizing terminals, means coupling a point on said second voltage-developing circuit and said field-current control means whereby said field-current control means can be controlled by the voltage developed at said point on said second voltage-developing circuit means, and control means connected with said second voltage-developing circuit and said voltage-sensing lead for controlling the magnitude of the voltage developed at said point on said second voltage-developing circuit, said control means providing a voltage at said point on said second voltage-developing circuit which has a value which is not sufficient to control the operation of said field-current control means when said voltage-sensing lead is connected to one side of said battery and when said bridge rectifier is connected with said battery, said control means operative to cause the voltage at said point to rise to a value such that it is capable of controlling said field-current control means when said voltage-sensing lead is disconnected from one side of said battery to disconnect said first voltage-developing circuit from said battery.

5. A voltage regulator for regulating the output voltage of a diode-rectified alternating-current generator operative to supply charging current to a battery in an automotive electrical system and having a field-winding comprising: field-energizing terminals adapted to be connected with direct-voltage output terminals of said alternating-current generator, a first transistor-switching means having collector-emitter current-carrying terminals and base-emitter control terminals for controlling conduction between said current-carrying terminals, said current-carrying terminals being adapted to be connected with the field winding of said alternating-current generator serially across said field-energizing terminals, a first voltage-sensing circuit for said voltage regulator, a voltage-sensing lead adapted to be connected with a first terminal of said battery for connecting said first voltage-sensing circuit across said battery, a transistor driver means having collector-emitter current-carrying terminals and base-emitter control terminals, said current-carrying terminals of said driver means being connected with said control terminals of said first transistor-switching means to render said first transistor-switching means conductive when said driver means is nonconductive and to render said first transistor-switching means nonconductive when said driver means is conductive, a first Zener diode connected between said first voltage-sensing circuit and a control terminal of said transistor driver means, a second voltage-sensing circuit for said voltage regulator, means connecting said second voltage-sensing circuit across said field-energizing terminals, a second Zener diode connected between said second voltage-sensing circuit and a control terminal of said transistor driver means, a second transistor-switching means having collector-emitter current-carrying terminals and base-emitter control terminals, means connecting said second transistor-switching means in shunt with at least a part of said second voltage-sensing circuit, and means coupling said voltage-sensing lead with the base-emitter control terminals of said second transistor-switching means to control the conduction of said second transistor-switching means, said second transistor-switching means being adapted to be biased conductive to reduce the voltage applied by said second voltage-sensing circuit to said second Zener diode and to the base-emitter control terminals of said transistor driver means to a value which is not sufficient to bias said transistor driver means conductive when said voltage-sensing lead is connected with said first terminal of said battery and said generator is connected with said battery, said second transistor-switching means being nonconductive and enabling said second voltage-sensing circuit as a control for said regulator when said voltage-sensing lead is disconnected from said battery.